United States Patent [19]

Austevoll

[11] Patent Number: 5,300,221
[45] Date of Patent: Apr. 5, 1994

[54] FILTER ARRANGEMENT

[76] Inventor: Oystein Austevoll, Rottingen, N-5228 Lepsoy, Norway

[21] Appl. No.: 859,722
[22] PCT Filed: Dec. 5, 1990
[86] PCT No.: PCT/NO90/00182
    § 371 Date: Jul. 28, 1992
    § 102(e) Date: Jul. 28, 1992
[87] PCT Pub. No.: WO91/08819
    PCT Pub. Date: Jun. 27, 1991

[30] Foreign Application Priority Data

Dec. 8, 1989 [NO] Norway ................. 894927
Jun. 1, 1990 [NO] Norway ................. 902434

[51] Int. Cl.$^5$ ............................. B01D 33/04
[52] U.S. Cl. ........................... 210/155; 210/159;
                          210/160; 210/393; 210/400
[58] Field of Search ............. 210/155, 158, 159, 160,
                          210/232, 327, 328, 335, 393, 400

[56] References Cited

U.S. PATENT DOCUMENTS

| 682,994 | 9/1901 | Parsons | 210/167 |
|---|---|---|---|
| 1,435,770 | 11/1922 | Welser, Jr. | 210/158 |
| 2,966,189 | 8/1961 | Salterbach | 210/335 |
| 3,802,565 | 4/1974 | Hughes et al. | 210/158 |
| 3,976,573 | 8/1976 | Miller | 210/158 |
| 4,096,062 | 6/1978 | Myreen et al. | 210/400 |
| 4,689,145 | 8/1987 | Mathews et al. | 210/335 |
| 4,692,242 | 9/1987 | Jackson | 210/160 |
| 5,059,313 | 10/1991 | Etschel et al. | 210/158 |

FOREIGN PATENT DOCUMENTS

108717 5/1984 European Pat. Off. .
2075853 11/1981 United Kingdom .

Primary Examiner—Christopher Upton
Attorney, Agent, or Firm—Francis C. Hand

[57] ABSTRACT

The filter arrangement is provided with a filter in the form of an endless conveyor which is releasably mounted within a transport chute through which a flow of water can be directed. The filter is formed as a unit to be released from supports at the bottom of the transport chute for ease of cleaning. The filter is further pivotally mounted at the lower end so as to be adjusted angularly relative to the flow of water through the transport chute. Seals are provided between the sides of the filter and the side walls of the transport chute to preclude passage of liquid. A plurality of such filters may be disposed within the transport chute and may be associated with various discharge conveyors for discharging materials which have been filtered out of the flow of liquid.

11 Claims, 4 Drawing Sheets

FILTER ARRANGEMENT

A filter arrangement is known, where a disc-shaped filter fabric in a first, lower zone is submerged in a liquid current which is to flow through the filter and where the filter fabric in a second, upper zone above the liquid current can have the deposited filter material removed. By having the filter fabric alternately submerged in and raised upwardly from the liquid current whicn is to be filtered, one has the possibility of ensuring a more or less continuous flow of liquid through the filter fabric, at the same time as filter material deposited on the filter fabric is separately removed in a correspondingly more or less continuous operation.

The filter fabric in a known filter arrangement, which is used especially in connection with the treatment of sea water or fresh water, which is to be employed for example as fresh water for fish breeding purposes, is fixed in a circular frame and is rotatable about a shaft at the center of the frame. Gradually as the flow of liquid passes through the portion of the circular filter fabric submerged in the current or liquid, during rotation of the filter fabric in the current of liquid, material which is to be filtered off from the current of liquid, is deposited on the filter fabric in its submerged, lower zone and is thereafter continuously removed from the upper zone of the filter fabric which is uncovered above the flow of liquid. A filter arrangement of the afore-mentioned kind is restricted for use in relatively protected conditions and covers therefore no application under more robust conditions outside in nature or under conditions where the filter arrangement is unmanned and thereby more or less left to itself under normal operation.

As a result of the rotation of the filter fabric across the direction of flow, materials accompanying the current of liquid, which are to be filtered off, have a tendency to be led correspondingly across the current of liquid along the rotating filter, so that one gets an upward concentration of such material mainly at the one side of the flow of current. The result is a gradually increasing collection of such material in a local region of the current of liquid at one side edge of the liquid flow. This can in turn result in the loading on the filter fabric becoming undesirably great in local regions of the filter fabric and in general it can be difficult to effect transfer of such material to a sufficient degree from the current of liquid to the filter fabric, as a consequence of blocking of the flow of water in front of the filter fabric. The efficiency of the filter fabric thereby becomes less than intended. Especially large and rigid objects, such as wooden sticks or the like, or clumps or similar collections of particles, which are not drawn upwardly into the path of movement of the filter fabric, have a tendency to gather up in front of the filter fabric and block the free through flow of liquid through the filter fabric. In addition, supporting or strengthening the filter fabric, so that it can tolerate the loading from the material in front of the filter fabric, can create problems. The filter fabric can especially be exposed to fracture produced by wooden sticks or similar objects which are accidentally carried along by the flow of liquid.

In EP-A-0 108 717 is shown a filter mechanism for a flow channel box. This mechanism comprises a conveyor belt, partially submerged in the flow channel box, rotating between upper and lower rollers. The filter, which is transporting filtered material to a further transport arrangement extending transversley of the filter and away from the flow channel box, is adjustable in obliquely upwards extending directions by pivotation of the filter about an upper horizontal axis. Liquid passing through the filter is passed out of the flow channel box in a separate conduit directly through the filter.

Briefly, the invention is directed to a filter arrangement which employs a transport chute or similar guide means for conveying a flow of liquid therethrough for filtering purposes. In addition, the filter arrangement has at least one filter arranged in the flow path of the liquid within the transport chute. In this respect, the filter is partially submerged in the flow path of the liquid in order to filter the liquid which passes therethrough. The filter also projects above the liquid flow in order to permit the removal of filtered off particles to a separate discharge location.

The filter is constructed in the form of an endless conveyor, for example, having a lower roller mounted on a horizontal axis at the bottom of the transport chute, an upper roller disposed above the chute and an endless filter fabric disposed over the rollers for filtering the flow of liquid passing therethrough.

The filter is further adapted to be adjusted in a direction extending obliquely upwards relative to the flow path of the liquid in the transport chute while the upper end of the filter communicates with a transport arrangement, such as a discharge chute which extends transversely relative to the filter for transporting filtered off solid material to a suitable discharge location.

The filter arrangement is suited to use in a series of different, especially environmentally stressed regions, as well as for other purposes. The filter is particularly intended for use in connection with the filtration of sewage but may also be employed for the purification of all kinds of drainage fluids, such as household, agricultural, fish breeding or industrial drainage fluids in pipes, brooks, rivers or the like. In addition, the filter arrangement can be employed for the filtration of water, especially sea water, where the filtered water is to be used for specific purposes, such as fresh water which is to be supplied to a fish breeding plant, or for the filtration of water, especially sea water where the material filtered off which contains plankton, algae, small fish and the like is to be taken care for special purposes, for example, for application as a feedstuff in the fish breeding trade and the like.

The filter arrangement is constructed to be able to be used under different conditions with more or less self-controlled or self-governed filtering operations, and particularly under relatively robust conditions. The filter arrangement is especially intended for use in a non-manned system where operation is self-governed, for example, by means of electrically controlled control equipment and operating equipment or is self-governed in a especially simple manner by means of water power, which, for example, can be taken from the flow force of the liquid current (water current) which is to be filtered or which, if necessary, is filtered by the filter arrangement.

One aim of the present invention is to allow liquid to pass in a continous flow through the filter and further through the flow channel past the filter. In this respect, the filter is located transversely of the flow channel as a filtering wall with a sealing effect against the flow channel. Such an arrangement allows the filter to pass the water in a controlled manner in a more or less continous flow through and past the filter, whereas only filtered off material is being transported out of the flow channel by the filter.

With the present invention the aim is a filter arrangement, which has a large capacity for filtration and the possibility for an effective extraction of filtered material from a transverse current of water, so that the collection of material which is to be removed from the current of water can be prevented in front of the filter fabric. At the same time, the aim is that the filter shall be spared unfortunate influences from objects which are accidentally pulled along in the flow of liquid. In addition, the aim is to produce an especially robust and simple solution which can be applied over a relatively large field of use.

The arrangement according to the invention is characterised in that the filter forms a readily mountably and dismountably suspended unit and comprises an upper roller and a lower roller which are rotatably mounted at opposite ends of a rigid support means extending longitudinally into an intermediate space between two opposite paths of the filter fabric, whereas the filter at the lower end thereof is pivotable about a horizontal axis at the bottom of the transport chute or similar guide means to be positioned in alternating obliquely upwards extending directions in relation to said bottom, and that the filter, which is arranged transversely of the flow path of the liquid in the transport chute or similar guide means, allows filtered liquid to be passed in a flow path therethrough, whereas the support means at mutually opposite edges thereof has sealing means projecting a distance laterally outside the filter fabric at its opposite longitudinal edges forming a sealing abutment between the filter and opposite side walls of the transport chute or similar guide means.

According to the invention there can be employed according to desire and need a filter or several filters in succession in the filter arrangement. According to desire the filter or filters can be arranged in specifically preferred angular positions relative to the flow path of the liquid or can be regulatably adjustable into various, desired angular positions, according to need. For a particular use situation (purification of discharge water from a fish processing installation) it has been found that an angle of about 60° is particularly favourable. It is possible to operate the filter or the various filters at different drive speeds, according to need for example at a relatively large speed in order to bring about a rapid removal of solid materials from the discharge water in front of the filter or at a lower speed in order to ensure an effective draining off of water from the solid material in the filtrate.

Instead of employing a rigid, rotatably mounted, disc-shaped filter fabric, by employing an endless filter fabric, which is flexible about, and which is moveable about an upper and a lower turning roller, (with the possibility for local support of the filter fabric in the region between the turning rollers), there is the possibility for achieving a far more robust and dependable solution. In addition, by allowing the filter fabric to move in a more rectilinear movement across the flow of water, instead of in a transverse rotary movement relative to the flow of water, an equivalent more or less rectilinear movement of the flow of water relative to the filter can be ensured. Besides, by disposing the filter fabric obliquely upwards and backwards relative to the flow of water (at regulatable angles) one is able by means of the filter to "skim off" the material, which otherwise necessarily has a tendency to collect in front of the filter fabric, by conveying the material by a lifting movement obliquely upwards from the flow of water. In addition, with a movement of the filter fabric obliquely upwards relative to the flow of water, there is achived an effective upwardly flowing movement of the current of water in front of the filter so that also solid material which otherwise has a tendency to be conveyed along the bottom of the current of water is lifted upwards in the water current to the filter. By this, one is able to ensure that for example wooden sticks or other relatively large objects or parts, such as clumps of material, instead of blocking the flow of water in front of the filter are raised positively upwards from and away from the flow of water, in order to be delivered to a suitable delivery location with material which is deposited on the filter fabric, at the upper, uncovered end of the filter above the flow of water and thereafter is removed to a suitable emptying location.

The removal of deposited filter material from the filter fabric can be effected by scraping and/or by rinsing through or blowing through and/or by suction (vacuum suction) and removal by vacuum transport, in a direction opposite to the direction of movement of the flow of liquid relative to the filter fabric. The removed filtered material can then be transported in a suitable manner to a suitable emptying location or to extra slime-treating equipment, while surplus liquid from such treating equipment can, if desired, be fed back to a region upstream of the filter arrangement or to a region between two filters of the filter arrangement. If desired, extra purification can also be effected by simple means with the aid of steam jets (steam treatment) for removing fat and the like.

Further features of the present invention will be evident from the following description having regard to the accompanying drawings, in which.

Figure 1:
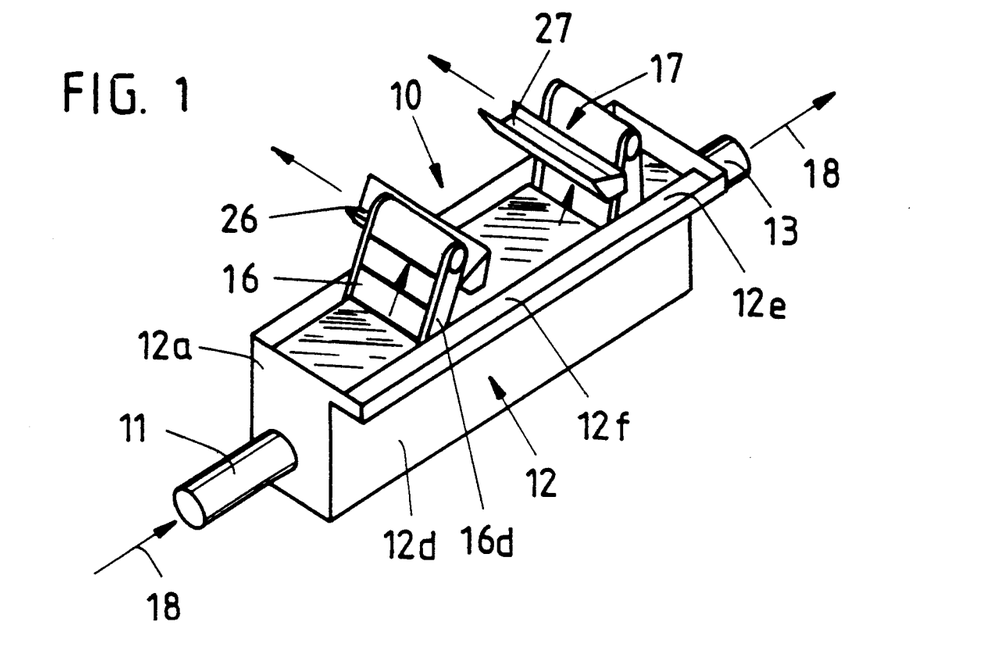
FIG. 1 shows in a perspective representation a filter arrangement according to the invention, according to a first embodiment.
Figure 2:
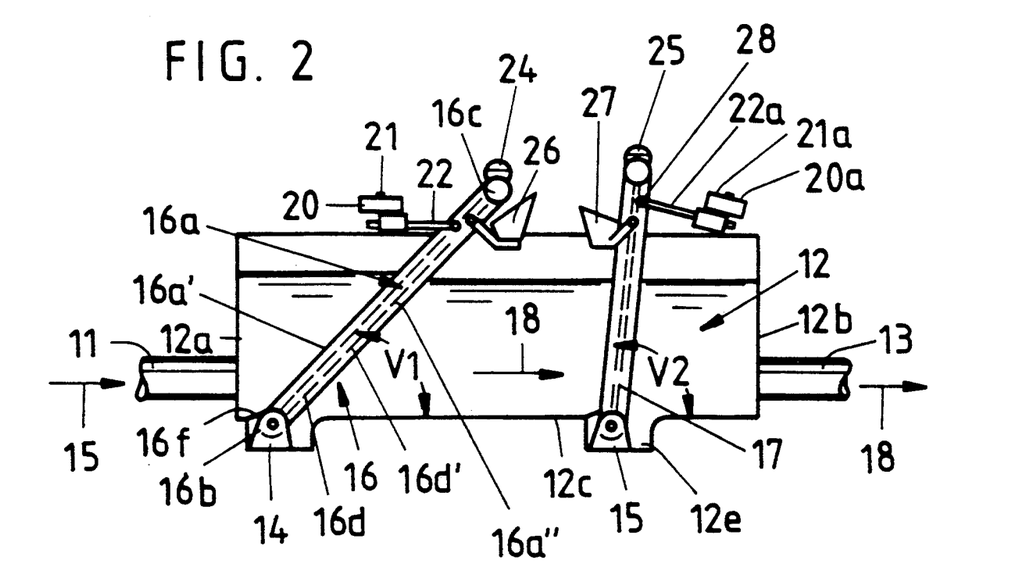
FIG. 2 shows a longitudinal section of the filter arrangement according to FIG. 1.

In FIGS. 1 and 2 there is shown a filter arrangement 10 which is specially designed on the outlet of feedstuff in the form of plankton, and the like from a liquid current of sea water. It is important that the feedstuff can be employed as "living" feedstuff, since it is considered that certain types of fish, especially small fish, catch by instinct only plankton in a living condition a, while dead plankton does not constitute feedstuff for the fish, but represents usually only a refuse material in connection with feeding. The objective is the output of plankton to the greatest extent possible in a living condition, so that the largest possible portion of the amount of plankton filtered off can be utilised as a feedstuff directly in the fish breeding trade.

In FIGS. 1 and 2 there is shown a feed pipe 11 from a liquid supply location (not shown) to the upstream end 12a of a box-shaped container 12 which forms a transport chute for conveying a flow of liquid therethrough and an equivalent discharge pipe 13 to a liquid delivery location (not shown) from the downstream end 12b of the filter container 12. In the illustrated embodiment, the container 12 is horizontally disposed and the feed pipe 11 is arranged at a level corresponding to the level of the discharge pipe 13. The liquid level 14 in the container 12 is shown at a level substantially above the level for the feed pipe 11 and the discharge pipe 13, the liquid level expressing the liquid pressure of the liquid in the feed pipe 11.

In practice, it will also be possible to arrange the container longitudinally oblique (in the one or the other direction) relative to a horizontal plane. It will also be possible to arrange the feed pipe 11 and the discharge pipe 13 at mutually different levels and at different levels relative to the container, in order to regulate the liquid-level in the container 12 all according to the pressure conditions of the liquid in the feed pipe.

The bottom 12c of the container 12 has two transverse recesses 12d and 12e at a suitable distance from each other longitudinally of the container. In each recess there is secured a console 14 and 15 respectively having two associated brackets (only the one bracket is shown in FIG. 1). Each console 14, 15 is adapted to form a fastening for its respective filter 16 and 17 which are obliquely disposed relative to the flow of liquid, as indicated by the arrows 18. More specifically the filter 16 is obliquely disposed and preferably obliquely disposed at a regulatable angle in a direction obliquely upwards and backwards reckoned in the direction of flow of the liquid.

The filters 16, 17 are constructed in a corresponding manner of an endless filter fabric 16a, which below passes over a lower turning roller 16b and above passes over an upper turning roller 16c. Between the turning rollers 16b and 16c and between the upper 16a' and lower 16a" paths of the filter fabric 16a there is arranged a rigid support member 16d which projects sideways outside the filter. This rigid support member 16d is pivotally mounted about the axis of the lower roller 16b to permit adjustment of the filter 16 angularly of the chute. The support member 16d is provided with a longitudinal sealing strip 16d' on each of the side edges of the filter in order to form a stationary seal against inner walls of the container 12. The sealing strip 16d' can be designed so that with a side flap it projects back inwardly over the edge portion of the filter fabric, so that it can also form a sliding sealing abutment against the edge portion of the filter fabric. At 16f there is shown a stationarily fastened sealing strip (lip sealing) which forms a sliding seal against the filter fabric in its breadth dimension and in addition over the whole breadth dimension of the container at the lower end of the filter. By this it is ensured that the whole current of liquid passes through the filter fabric of the filter.

A first, foremost filter 16 is shown obliquely disposed at an angle v1 of about 45°, while the second, rearmost filter 17 is obliquely disposed at an angle v2 of about 85°. As desired the filters can be adjusted into various other angular positions, both with positive and negative oblique angles. The latter applies especially to the filter or filters which necessarily follow the first filter in the direction of flow.

There is shown an electric motor 20 having a drive mechanism 21 for operation of one outer end of a rotary spindle 22 in an axial direction relative to a fastening on the filter 16. The drive arrangement 20, 21, 22 is shown arranged on the upstream side of the filter 16. By means of the rotary spindle 22, the filter 16 can be adjusted into various oblique positions extending obliquely upwards and backwards relative to the direction of flow of the liquid. An equivalent electric motor 20a, having a drive mechanism 21a and rotary spindle 22a, is adapted to readjust the filter 17 via an equivalent fastening into various oblique positions relative to the direction of flow of the liquid.

Each of the filters 16, 17 is, as is shown in FIG. 2, equipped with an associated electric drive arrangement 24 and 25 respectively.

The first filter 16 is a coarsely meshed filter for the removal of any small fish or similar relatively undesired material, while the second filter 17 is a more fine-meshed filter for the removal of plankton and similar organisms.

Just behind the upper end of the filter 16 there is fastened a discharge-chute 26 for conveying material which is carried on the filter fabric and which drains off from this at the upper end of the filter fabric. The discharge chute 26 can if desired be equipped with a screw conveyor (not shown) or other suitable drainage equipment for draining slime and other material which is drained off into the chute 26. If necessary, a scraping means (not shown further) can be employed for scraping off material which is deposited on the filter fabric, but it is preferred that an air blast nozzle or possibly a water blast nozzle (not shown further) is arranged in the intermediate space between the two paths of the filter fabric which pass on opposite sides of the upper turning roller, a succession of air streams or water streams being directed against the rear side of the filter fabric for the removal of material which is deposited on the filter fabric. Alternatively, material which is deposited can be removed by means of suction (vacuum suction). In addition, cleaning can be effected by steam blasting or other steam treatment for removing fat and the like. Especially when it is a question of removing plankton or similar sensitive organisms from the filter fabric, it is important that the removal takes place in a gentle and careful manner.

Just in front of the upper end of the filter 17 there is fastened a drainage chute 27 for conveying material which has passed the first filter 16, but which is deposited on the second filter and which for example consists of or has a large proportion of living plankton. It is important that the plankton is removed from the filter fabric before the plankton reaches the upper end of the filter where the fine-armed fastening means of the plankton can be torn off or damaged in another way by the upper turning roller. Just in front of the upper turning roller, that is to say just above the drain chute 27 there is shown a water rinsing nozzle 28 for rinsing off the rear side of the filter fabric, so that the plankton can be rinsed directly into position in the drain chute and from there can be washed away to a suitable delivery location by means of an extra current of water (not shown).

As is evident from FIG. 1 one upper side surface 12d of the container 12 is offset laterally outwards with a drain portion 12f, so that a laterally directed transfer duct is formed outside the filter 16 and outside the filter 17 respectively. Just behind the filter 16 (FIG. 3) a vertically disposed guide means 12g is mounted in the drain portion 12f for leading an overflow water current laterally back to the portion of the container lying within just behind the first filter 16.

Figure 3:
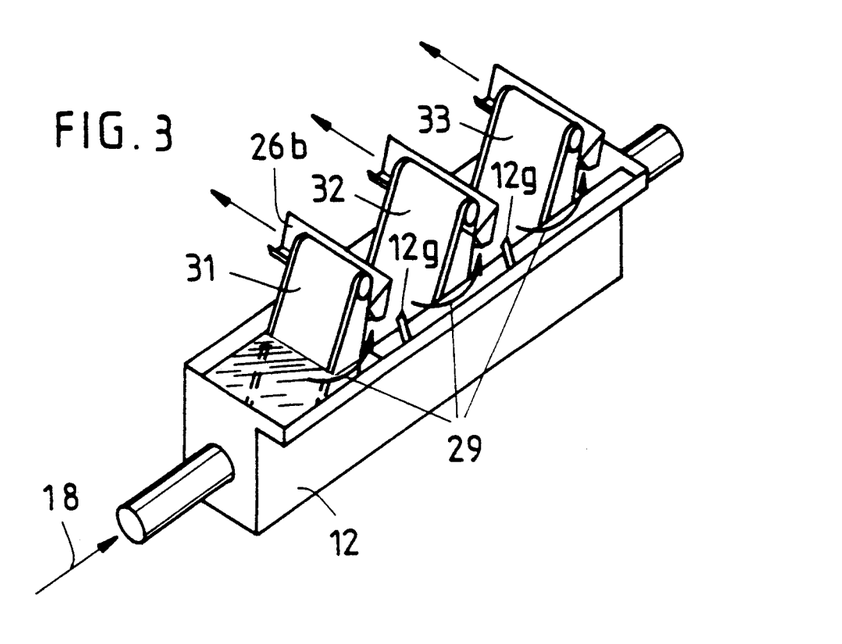
FIG. 3 shows in a perspective representation a filter arrangement according to the invention, according to a second embodiment.
Figure 4:
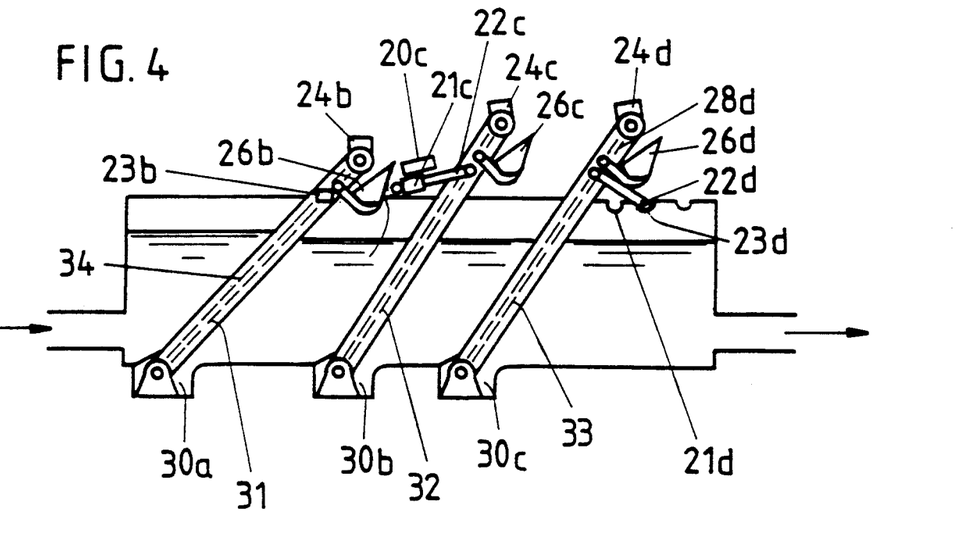
FIG. 4 shows a longitudinal section of the filter arrangement according to FIG. 3.

In FIGS. 3 and 4 there is shown a second embodiment of a filter arrangement which is specially designed for filtering discharge water, for example sewage.

There is illustrated a corresponding container 12 as shown in FIGS. 1 and 2, in which there are shown three recesses 30a, 30b, 30c in the bottom of the container for fastening three filters 31, 32, 33 mounted in succession one after the other and pivotably mounted in an equivalent manner as described above for the filters 16 and 17.

There can be employed a larger number of filters than illustrated herein without this being shown specifically herein, one can employ for example an especially fine-meshed filter fabric in a last or in one of the last filters in the succession of filters. There can also be employed a coarsely meshed second filter fabric to carry (support) the fine-meshed filter fabric in order to prevent thereby damage occurring to the fine-meshed fabric from destroying the whole filter. Local damage can be reduced to give only poorer filtration while the remainder of the fabric acts as normal, thanks to the support filter fabric.

The filter 31 is shown in a permanent angular position fastened to the upper edge portion of the container via the fastening means 23b. The filter is fastened at a specific angle of inclination of about 45° and is a particularly coarse filter with blade-forming ribs 34 which extend with suitable mutual spacing across the path of movement of the filter. There is shown a drain chute 26b equivalent to the drain chute 26 in FIGS. 1 and 2. The upper turning roller of the filter is driven by an electrical driving arrangement 24b.

The filter 32, which is a filter of average mesh size, is equipped with a regulating arrangement 20a, 21b, 22c, 23c corresponding to that which is described for the filters 16 and 17 in FIGS. 1 and 2. There is shown a drive arrangement 24c and a drain chute 26c corresponding to the drive arrangement 24 and the drain chute 26 as shown in FIGS. 1 and 2.

The filter 33, which is a filter of small-meshed mesh size, is equipped with a manually adjustable regulating arrangement, and there is shown a support arm 21d having a support lug 22d which forms a support in a locking groove 23d, among a series of such locking grooves arranged at the upper edge of the container. There is shown a drive arrangement 24d, a drain chute 26d and a blow nozzle 28d.

By arrows 29 (see FIG. 3) there is indicated possible overflow of the current of water, so that this can pass the filters without filtration if the filters should for one reason or another be clogged or be put out of operation in another way.

On cleaning of container 12 or filters 16, 17 and filters 31, 32, 33 respectively it is possible to extract the filters in turn and order by releasing the lower end of the filters from their pivot bearing-forming consoles after a simple dismantling of the rotary pins of the lower turning rollers and dismantling of drive arrangements, oblique positioning arrangements and drain chutes.

It is possible to produce the filters 16, 17 and 31, 32, 33 respectively with robust constructions which have a simple operation and which are relatively easy to maintain.

Figure 5:
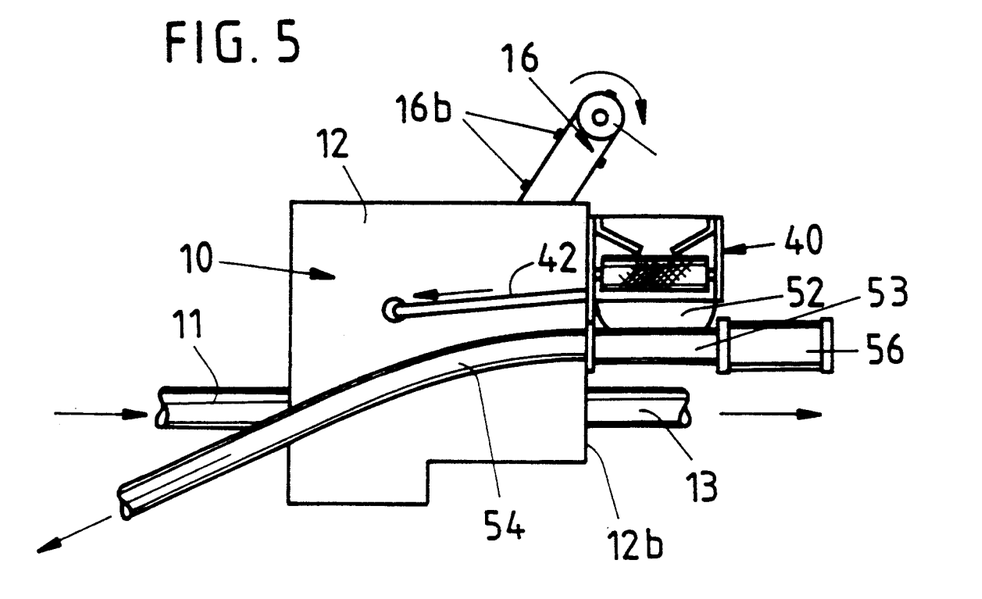
FIG. 5 shows schematically a filter arrangement equipped with a single filter, according to a third embodiment.

In FIG. 5 there is shown in a third embodiment a filter arrangement 10 having a feed pipe 11 for discharge water, connected to a transport chute or similar guide means, in the form of a box-shaped filter container 12 and having a discharge pipe 13 for the liquid filtered off. In this embodiment there is shown a single filter 16, which is constructed correspondingly to the filter 16 in FIG. 1, while disposed at a specific angular position relative to the bottom 12c of the container 12. An important deviation consists in the filter 16 having transverse ribs 16h which project a small distance outwardly from the main plane of the fabric and which span over the major part of the breadth direction of the filter fabric being designed in the filter fabric itself. In the illustrated embodiment, the filter is shown in a specifically, preferred angular position of about 60° relative to the bottom of the container 12. The upper end of the filter projects a distance above and endwise outside the end piece of the container 12 at the downstream end 12b of the container, so that draining off of solid material from the filter can occur outside the container 12.

Figure 6:
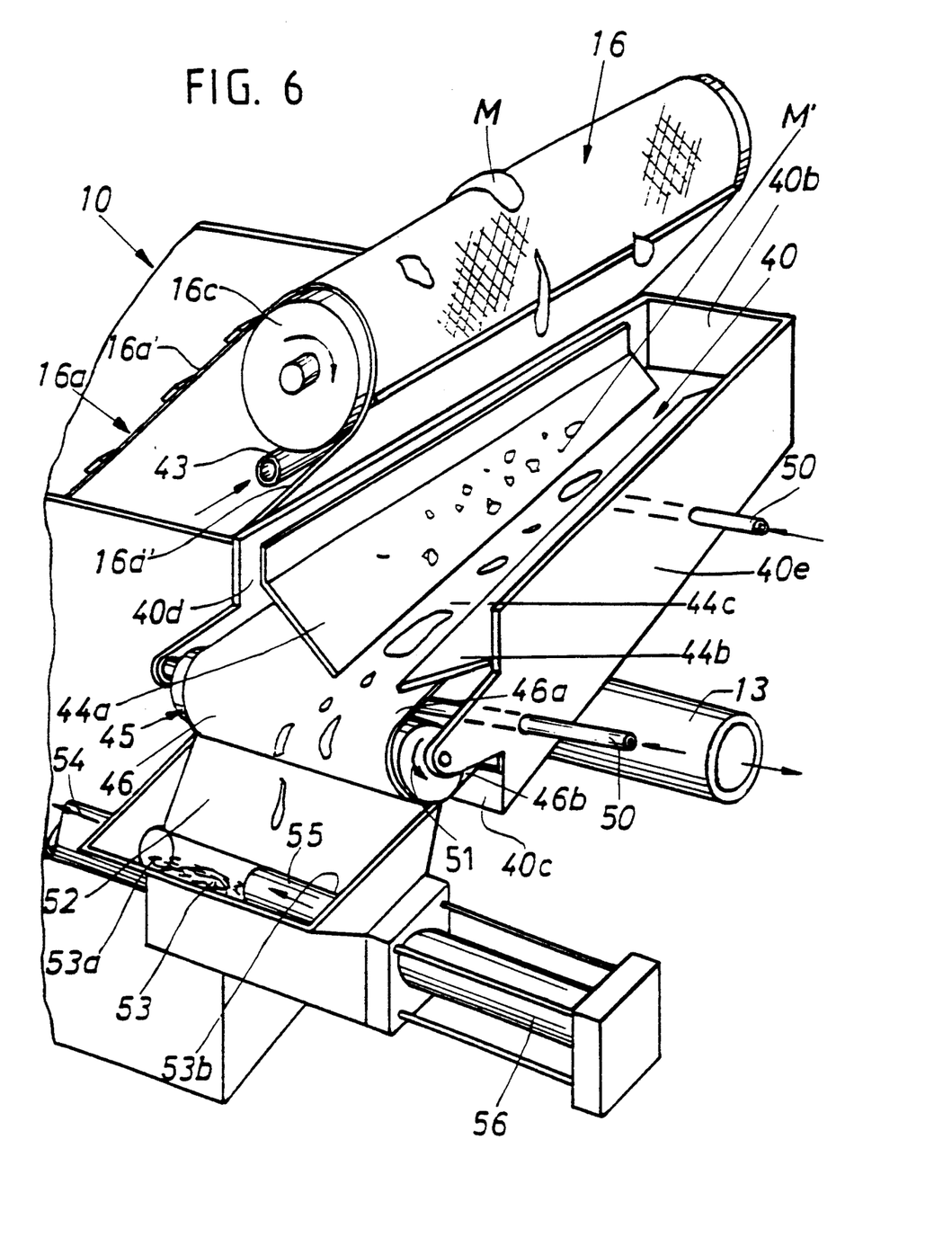
FIG. 6 shows in a perspective representation a part of the filter arrangement according to FIG. 5.
Figure 7:
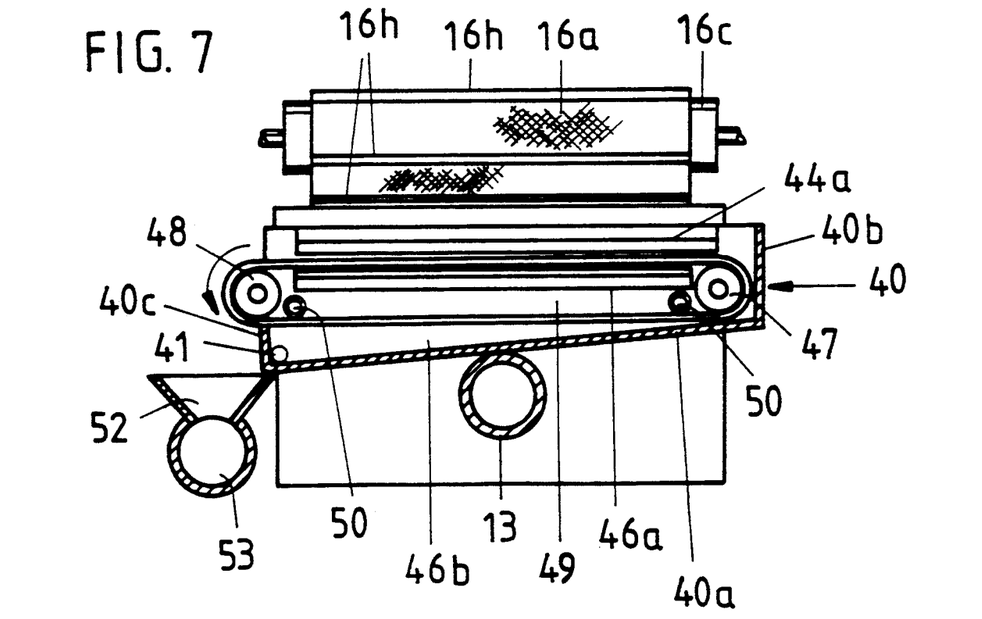
FIG. 7 shows the same as in FIG. 6 viewed from the one side.

In FIGS. 6 and 7 there are shown details of the downstream end of the filter arrangement 10. More specifically there is fastened outside the filter container, that is to say to the end piece of the box-shaped filter container 12, a transverse chute 40 having a bottom 40a, two short opposite end walls 40b and 40c and two elongate, opposite side walls 40d and 40e. The bottom 40a preferably inclines downwards from the right side shown in FIG. 7 to its left side, that is to say from the end wall 40b towards the end wall 40c. In the transition between the end wall 40c and the bottom 40a is a laterally directed discharge 41 connected to a separate discharge conduit 42 which leads back to the container 12 (see FIG. 5). The one side wall 40d is fastened directly to the end piece of the container 12 at its downstream end 12b, just above the discharge pipe 13. The side wall 40d is terminated just below the lower return path of the filter 16.

As shown in FIG. 6 there is arranged a pressure water pipe 43 between the upper path 16a' of the filter fabric 16a and lower path 16a''. The pressure water pipe 43 is provided with a series of laterally directed nozzle openings which are adapted to direct their respective water jets obliquely outwards and downwards towards the rear side of the lower path 16a'' of the filter fabric 16a just below the upper turning roller or drive roller 16c of the filter, so that the water jets are directed simultaneously downwards and outwards towards the chute 40 lying below.

Uppermost in the chute 40 there are arranged guide plates 44a and 44b which extend from their respective side walls 40d, 40e obliquely downwards and inwards towards the vertical longitudinal central plane of the chute. The guide plates are individually fastened to their respective side walls with suitable fastening means. Just below the guide plates 44a, 44b there is arranged a conveyor 45 comprising a mesh-formed fabric material in the form of an endless belt 46 which passes over a first, driving roller 47 at the one end and a second driven roller 48 at the opposite end. The roller 47 is driven by a drive motor 47a at one end of the drive rollers and is received in the chute 40 just above the bottom 40a at the end wall 40b. The roller 48 is mounted just above the end wall 40c and projects with parts of the roller 48 endwise outside the drain 40 at its end wall 40c. Just below upper path 46a of the belt 46 there is arranged a longitudinal training wall 49 of inverted V-shaped cross-section, so that water which is filtered through upper path 46b of the belt 46 is led sideways outside the lower path of the belt 46 and is drained towards the bottom 40a of the chute 40. Just above the lower path 46b of the belt 46 and just below the wall 49 at its two opposite ends there is arranged a pressure water pipe 50 extending sideways relative to the belt 46 with a series of nozzle openings for directing their respective water jets from above and downwards towards the rear side of the lower path 46a" of the belt 46. In the drawing there are illustrated two such pressure water pipes 50, that is to say one at each respective end of the belt 46. In practice however only one such pressure water pipe can be employed at one end of the belt, preferably at its inner end relative to the chute 40. The direction of movement of the belt is shown by the arrow 51.

Just below the turning roller 48 of the belt 46 there extends a funnel-shaped guide portion 52 downwards towards a collecting chamber 53. One end 53a of the collecting chamber 53 is connected to a discharge pipe 54 and its opposite end 53b is connected to a compressed air-driven or hydraulically driven piston 55 received in an asociated pressure cylinder 56. By means of the piston 55, material which has collected in the collecting chamber 53 can be pressed together by intermittent strokes of the piston and is pushed endwise inwardly into the discharge pipe 54 in order to be pressed forward to a suitable delivery location for relatively drained off material.

As is evident from FIGS. 6 and 7 drained off, coarse solid material M is discharged from upper roller 16c of the filter 16 directly from the filter fabric 16a to a gap 44c between the guide plates 44a and 44b and further to upper path 46a' of the belt 46, while more fine grained or fine particle solid material M' which is rinsed off by means of the water jets from the pressure water pipe from the lower path 16a" of the filter fabric 16a is correspondingly led to the gap 44c and the upper path 46a of the belt 46 and further together with the solid material M to the collecting chamber 53. The rinsing water from the pressure water pipe 43 is emptied on to the upper path 46' of the filter fabric 46 and is drained off through the filter fabric to the bottom of the chute 40. The fine particle or fine grained material which adheres to the filter fabric 46 after this has passed the turning roller 48 is rinsed off by the jets of water from the rinse water pipes 50 towards the bottom of the chute 40, in order to be brought together with the discharge water in the discharge pipe 42 back to the upstream end of the filter container 12.

If desired (not shown further) the one pressure water pipe 50 which is arranged just by the turning roller 48, together with the turning roller 48 can be arranged in its totality outside the drain 40, so that the rinsing water together with the solid material M' can be led directly to the guide portion 52 and the collecting chamber 53. A relatively small amount of water can be employed by the pressure water pipe 50 outside the chute and a greater amount of water with more effective rinsing off by the pressure water pipe 50 internally in the chute 40.

By means of the filter arrangement as illustrated in FIGS. 5-7 an effective filtration of the solid material from discharge water can be achieved by means of a single filter, so that the filtered discharge water can be led with a relatively low content of solid materials to a further treatment tank (not shown further) for sedimentation of possible residual materials and possible further treatment by biological/chemical purification before the water is discharged into the sea or lake.

The filter arrangement has been tried out in connection with a fish processing installation for bleeding, gutting and cleaning of fish. By means of a suitable work table with associated discharge to an offal collecting chamber and separate discharge to the filter arrangement, the otherwise usual aqueous dirt can be limited to a minimum at the processing location, at the same time as fish intestines, including fish blood, fish fat and the like is able to be handled in relatively concentrated form and in relatively well drained off condition for suitable delivery locations.

By means of a relatively rapid transfer of fish particles from fish processing location to discharge location there is the possibility of utilising in an efficient manner the solid materials from the filtrate together with the fish offal remaining for raw material for animal fodder, fish fodder, and the like. It has been found that the continuous rinsing of the filter fabric 16a and the belt 46 has provided the possibility for effective cleaning of the filter arrangement.

I claim:

1. A filter arrangement comprising
  a transport chute for conveying a flow of liquid therethrough, said chute having a pair of side walls and a bottom;
  at least one filter disposed in said chute transversely of the flow of liquid, said filter including a lower roller mounted on a horizontal axis connected to said bottom of said chute, an upper roller disposed above said chute, at least one rigid support member extending between said rollers and being pivotally mounted about said axis of said lower roller to permit adjustment of said filter angularly of said chute, and an endless filter fabric disposed over said rollers for filtering a flow of liquid therethrough; and
  sealing means between said filter and each said side wall of said chute to prevent passage of liquid therebetween.

2. A filter arrangement as set forth in claim 1 which further comprises a drive mechanism connected to an upper end of said filter for pivoting said filter about said horizontal axis.

3. A filter arrangement as set forth in claim 1 which further comprises a discharge chute adjacent said upper roller of said filter for conveying material discharged from said filter at said upper roller.

4. A filter arrangement as set forth in claim 1 which further comprises at least a second filter in said chute downstream of said one filter, said second filter having an upper roller disposed above said chute, a lower roller at said bottom of said chute and an endless filter fabric.

5. A filter arrangement as set forth in claim 4 which further comprises a drainage chute adjacent said upper roller of said second filter for conveying material deposited from said second filter.

6. A filter arrangement as set forth in claim 5 which further comprises a water rinsing nozzle above said drainage chute and below said upper roller of said second filter for rinsing plankton from said second filter directly into said drainage chute.

7. A filter arrangement as set forth in claim 4 wherein said transport chute has an overflow-forming lateral extension on at least one of said side walls to permit bypassing of a portion of the liquid about a respective filter.

8. A filter arrangement as set forth in claim 4 wherein said fabric of said second filter has a smaller mesh opening than said fabric of said one filter.

9. A filter arrangement as set forth in claim 1 wherein said filter is releasably connected to said bottom of said transport chute for extraction therefrom as a unit.

10. A filter arrangement as set forth in claim 1 wherein said bottom of said chute has a recess receiving said lower roller of said filter and which further comprises a seal extending between said filter and said bottom at said lower roller and extending cross said chute.

11. A filter arrangement as set forth in claim 1 which further comprises a transverse chute extending below said upper roller of said filter to receive discharged material therefrom, an endless conveyor in said transverse chute for conveying material to one end of said transverse chute and a collecting chamber below said endless conveyor at said one end of said transverse chute to receive material therefrom.

* * * * *